Jan. 19, 1960     G. A. DEL CONTE     2,922,152
WARNING AND SIGNAL DEVICE FOR VEHICLES
Filed May 22, 1958
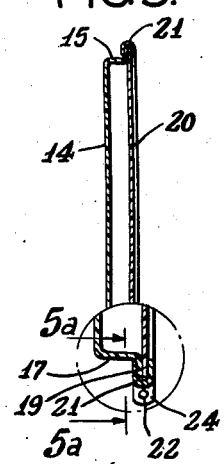
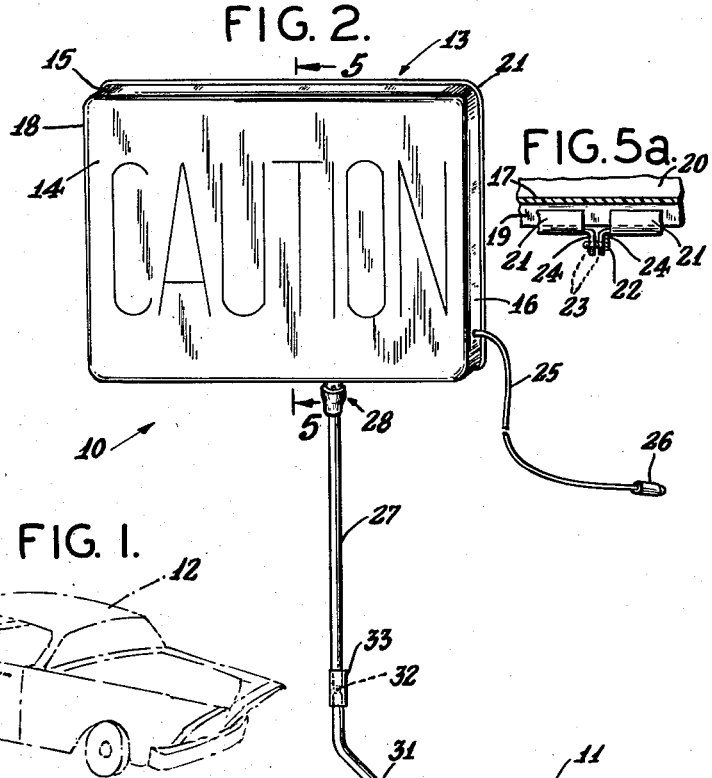
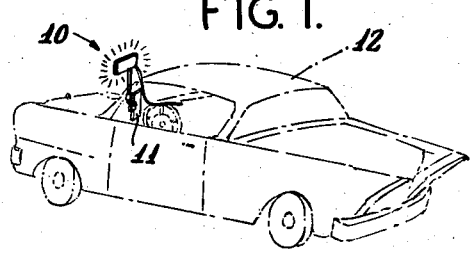
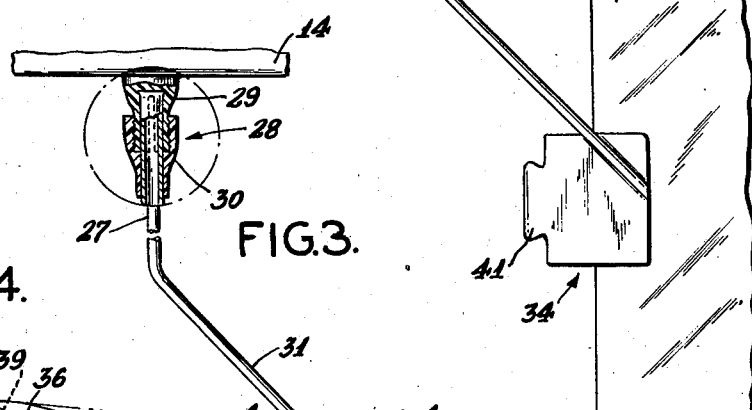
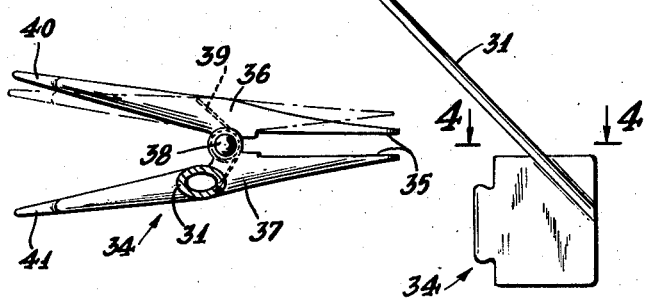
INVENTOR.
GEORGE DEL CONTE
BY
Joseph D. Lazar
ATTORNEY United States Patent Office 2,922,152
Patented Jan. 19, 1960

2,922,152
WARNING AND SIGNAL DEVICE FOR VEHICLES

George A. Del Conte, Holbrook, Mass., assignor of forty percent to William Sterdwell Lawson, Holbrook, Mass., and twenty percent to Arrien & Foley, New York, N.Y.

Application May 22, 1958, Serial No. 737,054

2 Claims. (Cl. 340—366)

This invention relates to a warning device for an automotive vehicle which is for use to mark or indicate the presence of a disabled vehicle when either standing still or moving, either during daylight hours or in darkness.

Whenever an automotive vehicle is brought to a standstill upon a road after darkness has set in for appropriate repair or attention, such vehicle constitutes a grave hazard. In such situations it is customary to employ flares. However, flares have the disadvantages in that they are inconvenient to store, offer a distinct fire hazard and the user of the flares must first leave the vehicle to place the flares in position and into operation. On the other hand, there are circumstances under which an automotive vehicle may be disabled, partially disabled or movable while in a partially disabled condition which necessitates warning approaching or overtaking vehicles of the existing disability.

An object of the present invention is to provide a signal and marker device which eliminates the fire hazard of flares and which is readily placed in operation to serve as both a signal and marker for indicating the location of a stalled or disabled vehicle upon a road or a moving vehicle which is partially disabled or is operating faultily, without the necessity of the driver or occupants of the disabled automotive vehicle leaving the safety of the vehicle to place the signal and marker device in operation.

Another object of the present invention is to provide a signal and marker device which is simple in structure, easy to install, universal in use and highly efficient in action, even when the vehicle is desired to be moved.

A still further object of the present invention is to provide a collapsable device for easy packaging for accessible and convenient storage within the occupied compartment of the automotive vehicle, for example, under the driver's seat.

A still further object of the present invention is to provide a signal and marker device adapted for universal mounting on either side of an automotive vehicle provided with left side or right side vent windows, without making any alterations to the automotive vehicle.

A still further object of the present invention is to provide a signal and marker device, which when properly mounted, will permit the left side and right side vent windows to be sufficiently closed during inclement weather, to protect the occupants therefrom.

Other objects and advantages will become apparent from the following description taken in conjunction with the accompanying drawings wherein:

Fig. 1 is an isometric view of an automobile showing the warning and signal device of the invention mounted thereon;

Fig. 2 is an elevation enlarged view of the warning and signal device mounted on the trailing edge of a vent window;

Fig. 3 is a fragmentary view showing in detail the coupling connection between the warning and signal sign proper and the support rod;

Fig. 4 is a plan view of the spring clip taken on the line 4—4 of Fig. 3;

Fig. 5 is a sectional view taken on line 5—5 of Fig. 2 showing an enlarged fragmentary view of the means for clamping the sealing band of the front and rear faces of the warning sign proper; and Fig. 5a is a fragmentary view of the clamp taken along line 5a—5a of Fig. 5.

Referring to the drawings, the warning and signal device 10 of the present invention is shown mounted on the left side vent window 11 of the automobile 12.

In Fig. 2 there is shown in greater detail the warning and signal device 10. The warning and signal device comprises a warning signal housing 13, having a front face 14. Formed perpendicular to the face 14 are relatively short top and bottom side walls 15 and 17, and right and left side walls 16 and 18. The side walls are provided with a peripheral narrow lip 19 as shown in Fig. 5. The rear face 20 of housing 13 is a rectangular flat surface connected to the peripheral lip 19 by means of a continuous banding 21 formed in a U-shape to overlap the edges of the peripheral lip 19 and the edge of rectangular rear face 20. The banding 21 may be provided with moisture insulating material in the inner surface thereof. The respective ends of the banding 21 are connected together by a pin 22 or similar device inserted in apertures 23 of a tab ending 24 integrally formed on the respective ends of the banding 21.

The walls of the warning and signal device housing 13 may be made from a plastic or light metal material and is provided on both faces thereof with appropriate transparent lettering or characters either engraved thereon, or by any other expedient known to the art, through which a flashing light is transmitted. The banding material may be made of sheet aluminum, steel or any other pliable material suitable for the purpose described.

Within the housing 13, not shown, is appropriately mounted, a flasher unit including at least one automotive light bulb of sufficient candle power to transmit light through the transparent lettering or characters of the housing to be visible for a reasonable distance. Also included in the flasher unit is appropriate electrical or electro-mechanical circuitry connected to the lamp whereby the electrical energy is interrupted at a pre-determined rate thereby causing the lights to flash intermittently. The flasher unit is energized by means of a flexible electrical wire 25 having attached thereto a plug 26 adapted for insertion into an appropriate cigarette lighter receptacle of the vehicle. If no cigarette lighter receptacle is provided in the vehicle, the ends of the electrical wire 25 may be provided with clips or other similar means for connection to the battery supply of the vehicle.

The warning and signal device housing 13 is rigidly secured to a straight support rod 27 by means of a coupling device 28 shown in detail in Fig. 3. Integrally formed on the bottom wall 17 of the housing 13 is an externally threaded hollow member 29 adapted to receive therein the end of the support rod 27. The threaded wall of the member 29 is provided with a plurality of longitudinal slits. Riding on rod 27 is a slideable sleeve 30 internally threaded for threadable engagement with the threads of member 29. The support rod 27 is firmly and non-rotatably gripped by the member 29 when the sleeve 30 is tightened thereon. The slitted openings in member 29 are compressed over the support rod 27 by the tightening action of sleeve 30, thereby providing a sure, non-rotatable connection to the warning and signal device housing. Preferably, the end of support rod 27 is flared so as to prevent movable sleeve 30 from coming over the end thereof.

The straight support rod 27 is pivotally connected to an angular rod 31 at connection 32. An internally tapered sleeve 33 is adapted for free slideable movement from a position on the support rod 27 downward to a non-slideable position over the pivotal connection 32 in a firm tight grip thereby preventing pivotal movement at the connection 32 and acting so that support rod 27 and angular rod 31 are rigid as if one rod.

The lower end of angular rod 31 is connected to a spring loaded clip 34 as shown in greater detail in Fig. 4. The spring clip 34 is adapted for clamping engagement of the trailing edge of the side vent window 11. The inner surface 35 of spring clip 34 may be treated or provided with a suitable material to provide a high friction surface. Spring clip 34 comprises a pair of matched pivotal members 36 and 37 pivoting about pin 38. A spring 39 is mounted and adapted for tensioning the pivotal members 36 and 37 in a closed position as shown in Fig. 4 for a non-slip clamping action on the vent window 11. The clamping faces 35 are preferably of a large surface area for maximum non-slip clamping action.

The spring clip 34 is provided with handle portions 40 and 41 adapted for easy manual operation.

In use, because of the simple construction of the component parts, the warning and signal device may be assembled by the user without leaving the automotive vehicle. The support rod 27 is inserted into the member 29 and the sleeve 30 is screwed thereon. The positioning of the housing 13 may be pre-set to any desired angular position and held securely in this pre-set position by tightening sleeve 30. The tapered sleeve 33 is slid over the pivotal connection 32. The entire assembled unit is then clamped by the user to either the left side or right side vent window 11 by means of spring clip 34, as shown generally in Fig. 1. The plug 26 is inserted in the cigarette lighter receptacle and the flasher unit commences operation.

The warning and signal device of the present invention is adaptable for assembly and positioning without the necessity of the user leaving the interior safety of the automotive vehicle. Advantageously, the device is capable of being used while the vehicle is moving at conventional speeds since the clamping means for fastening the device to the vent window is arranged with a large spring tensioned area for non-slip engagement with the window.

Accordingly, the signal device of the present invention may be provided with appropriate letters or characters for use to mark processions, parades and the like.

What I claim is:

1. In a warning signal device for an automotive vehicle, a housing for an electrically energizable lamp, and a support member for supporting said housing outboard and above the vehicle, said housing characterized by a unitary front face member with relatively short top, bottom and side walls perpendicular to said front face, a narrow peripheral lip parallel to the front face extending perpendicularly outward from said top, bottom and side walls, a unitary plane rear face member dimensioned to be coextensive with the outer edge of said peripheral lip and positioned against the surface of said lip, a single length flexible band of U-shape form adapted to overlap the edges of the peripheral lip and said rear face, and means for connecting the ends of said band in overlap position maintaining said band taut and thereby firmly holding together said front and rear member, at least one of said wall members being provided with surface portions representing characters transparent to light.

2. A warning signal device according to claim 1, wherein said support member includes two pivoted portions, one of said portions being a rigid straight rod connected at one end to said housing and pivotally connected at the other end thereof to an angular rod, the other of said portions, a sleeve on said straight rod portion tapered to be freely slideable along said rod to a fixed position over the pivotal connection when the portions are in axial alignment to maintain said two portions in a rigid axial relation to one another.

References Cited in the file of this patent

UNITED STATES PATENTS

| | | |
|---|---|---|
| 2,252,395 | Cohen | Aug. 12, 1941 |
| 2,375,121 | McClellan | May 1, 1945 |
| 2,511,893 | Alden | June 20, 1950 |
| 2,597,705 | Clines | May 20, 1952 |
| 2,657,379 | Zappia | Oct. 27, 1953 |
| 2,856,598 | Bokair | Oct. 14, 1958 |